United States Patent [19]

Chan et al.

[11] Patent Number: 4,688,227
[45] Date of Patent: Aug. 18, 1987

[54] LASER COOLING OF ELECTRON BEAM AND FREE ELECTRON LASER USING LASER COOLING

[75] Inventors: Vincent S. Chan, Del Mar; Shiu-Chu Chiu, San Diego; Tihiro Ohkawa, La Jolla, all of Calif.

[73] Assignee: GA Technologies Inc., San Diego, Calif.

[21] Appl. No.: 776,395

[22] Filed: Sep. 16, 1985

[51] Int. Cl.$^4$ .................................................. H01S 3/00
[52] U.S. Cl. ........................................ 372/2; 372/34; 372/70
[58] Field of Search ............................ 372/2, 34, 55, 70

[56] References Cited

U.S. PATENT DOCUMENTS

| | | | |
|---|---|---|---|
| 4,323,857 | 4/1982 | Brau et al. | 372/2 |
| 4,479,219 | 10/1984 | Madey | 372/2 |
| 4,491,948 | 1/1985 | Deacon et al. | 372/2 |

OTHER PUBLICATIONS

Tecchio et al.; "Diagnostics with a Laser Beam in Electron Cooling Experiment", Nuovo Cimento B (Italy), vol. 85B, Sec 2; No. 2, pp. 217-228, 11 Feb. 85.
Gover et al., "Feasibility of dc to Visible High Power Conversion Employing a Stimulated Compton Free Electron Laser with a Waveguided $CO_2$ Laser Pump Wave and an Axial Mag. Field"; J. Appl. Phys. 53 (1), Jan'86.
Bohm, D. and L. Foldy, "The Theory of the Synchrotron," Phys. Rev., vol. 70, Sep. 1 and 15, 1946, pp. 249-258.
Sands, Matthew, "Synchrotron Oscillations Induced by Radiation Fluctuations," Phys. Rev., vol. 97, Jan. 15, 1955, pp. 470-473.
Robinson, Kenneth W., "Radiation Effects in Circular Electron Accelerators," Phys. Rev., vol. 111, Jul. 15, 1958, pp. 373-380.
Renieri, A., "The Free-Electron Laser: The Storage Ring Operation," High Power Lasers and their Applications, C. Pelligrini, ed., International School of Physics, E. Fermi, Varenna, 1978, pp. 414-477.
Sprangle, P., and V. L. Granatstein, "Enhanced Gain of a Free-Electron Laser," Phys. Rev. A, vol. 17, May 1978, pp. 1792-1793.
Meystre, P., Gerald T. Moore, Marlan O. Scully and Frederic A. Hopf, "On Velocity Narrowing in Free-Electron Lasers Using Electron Echo Techniques," Optics Communications, vol. 29, Apr. 1979, pp. 87-90.

(List continued on next page.)

Primary Examiner—Leon Scott, Jr.
Attorney, Agent, or Firm—Fitch, Even, Tabin & Flannery

[57] ABSTRACT

A method of cooling an electron beam with electrons having energies in excess of 10 MeV by directing a cooling laser beam over the path of the electron beam so as to achieve Compton scattering interactions, and a device which utilizes this method with other elements to produce a free electron laser system having much greater efficiencies than a single pass free electron laser. This system combines means for producing an electron beam having a narrow energy spectrum in the range above 10 MeV, means for extracting energy from the beam in the form of electromagnetic radiation; means for accelerating the electron beam to replace the energy lost in the extraction means, an optical resonance cavity surrounding the extraction means for producing an output laser from the electromagnetic radiation; electron beam transport means for directing said electron beam in a recirculation loop through the acceleration means and the extraction means; a cooling laser means for generating a cooling laser beam with a laser radiation intensity in excess of 1 times $10^7$ V/cm; a laser beam transport means for directing said cooling laser in a reflection path a portion of which is substantially the same as a portion of the electron beam recirculation loop so as to achieve Compton scattering interactions between some of the cooling laser photons and some of the electron beam electrons whereby the Compton scattering interactions reduces the spreading of the energy spectrum of the electron beam caused by the action of the extraction means.

8 Claims, 2 Drawing Figures

OTHER PUBLICATIONS

Elias, Luis R., "High-Power, cw, Efficient, Tunable (uv through ir) Free-Electron Laser Using Low-Energy Electron Beams," *Phys. Rev. Letters,* vol. 42, Apr. 9, 1979, pp. 977-981.

Deacon, David A. G., and John M. J. Madey, "Isochronous Storage-Ring Laser: A Possible Solution to the Electron Heating Problem in Recirculating Free-Electron Lasers," *Phys. Rev. Letters,* vol. 44, Feb. 18, 1980, pp. 449-452.

Boehmer, H., M. Z. Caponi, J. Edighoffer, S. Fornace, J. Munch, G. Neil, B. Saur and C. Shih, "An Experiment on FEL Efficiency Enhancement with a Variable Wiggler," *IEEE Transactions on Nuclear Science,* vol. NS-28, Jun. 1981, pp. 3156-3159.

Grossman, W. M., T. L. Churchill, D. C. Quimby and J. M. Slater, and J. Adamski, R. C. Kennedy and D. R. Shoffstall, "Demonstration of Large Electron-Beam Energy Extraction by a Tapered-Wiggler Free-Electron Laser," pp. 52-58.

Billardon, M., P. Elleaume, J. M. Ortega, C. Bazin, M. Bergher, M. Velghe, Y. Petroff, and D. A. G. Deacon, K. E. Robinson, and J. M. J. Madey, "First Operation of a Storage-Ring Free-Electron Laser," *Phys. Rev. Letters,* vol. 51, Oct. 31, 1983, pp. 1652-1655.

Begelman, Mitchell C., Rogert D. Blandford and Martin J. Rees, "Theory of Extragalactic Radio Sources," *Rev. Mod. Phys.,* vol. 56, No. 2, Part 1, Apr. 1984, pp. 255 and Appendix B.

"Infrared Free-Electron Laser Uses Electrostatic Accelerator," *Physics Today,* Nov. 1984, pp. 21-23.

LASER COOLING OF ELECTRON BEAM AND FREE ELECTRON LASER USING LASER COOLING

This invention pertains to the cooling of electron beams, to free electron lasers and moe particularly to the cooling of recirculated electron beams in free electron lasers.

BACKGROUND OF INVENTION

The concept of extracting coherent optical radiation to produce a laser beam from a stream of free relativistic electrons has been known since the early 1970's. In most free electron laser applications, coherent radiation is produced when an electron beam is forced to pass through magnetic fields having different directions, which fields of different directions are produced by devices called "wiggler magnets." However, in one pass through the cavity only a tiny fraction of the beam energy is converted to coherent radiation, resulting in very low efficiencies. In order to improve efficiencies, efforts have been made to recover the energy of the electron beam remaining after its pass through the resonance cavity or to recirculate the beam for additional passes through the cavity.

At low electron beam energies (i.e., where the electrons in the beam have energies less than 10 MeV), most of the energy of the beam can be recovered by collecting the beam at high negative potentials. (See L. R. Elias, High-Power, cw, Efficient, Tunable (uv through ir) Free-Electron Laser Using Low-Energy Electron Beams, Phys. Rev. Lett., Vol. 42, Apr. 9, 1979, pp. 977-981.) The wavelength of the output laser is a function of the beam energy. An electron beam limited in energy to 10 MeV will limit the wavelength of the output laser to wavelengths of greater than approximately $20 \times 10^{-4}$ cm.

The principal difficulty with recirculation of the beam is that a high efficiency output laser requires an electron beam with a very narrow energy spectrum, but the wiggler magnet process of extracting the coherent radiation reduces the magnitude of the energy of the beam and spreads the energy spectrum. Therefore, unless the quality of the recirculating electron beam can be improved between passes through the wiggler magnets, the efficiency of the output laser diminishes with each pass.

It is well known that the magnitude of a recirculated beam can be reinstated with an rf accelerator, and a combination of synchrotron radiation and additional wiggler magnets has successfully been used to reduce the energy spectrum spread of beams of electrons having energy in excess of 500 MeV. (See M. Billardon, et al., First Operation of a Storage-Ring Free-Electron Laser, Phys. Rev. Lett., Vol. 51, Oct. 31, 1983, pp. 1652-5.) The spreading of the energy spectrum is referred to as the "thermalization" of the beam, and the reduction of the spread of the energy spectrum is referred to as "cooling" the beam. Below 500 MeV, the magnetic fields required for this mechanism become too large to work effectively. A 500 MeV lower limit on electron energy limits the laser wavelength to less than about $10^{-4}$ cm.

Wavelengths between $10^{-4}$ cm and $20 \times 10^{-4}$ cm are of interest because of their potential use in isotope separation and because of their transparency in the atmosphere. This range can be produced in free electron lasers using electron beams with narrow energy spectrums in the range of 10 to 500 MeV. What is needed is a method of cooling an electron beam having electron energies in the range above 10 MeV and especially in the range of 10 to 500 MeV so that the electron beam can be recirculated through a free electron laser in order to operate the laser at high efficiency.

SUMMARY OF THE INVENTION

The present invention provides a method of cooling an electron beam having electron energies in a range above 10 MeV. It also provides means of filling in the missing gap in the energy range of efficient free electron lasers. It utilizes this beam cooling method with other elements to produce a free electron laser system having much greater efficiency than single pass free election laser systems.

The free electron laser system of the present invention combines means for producing an electron beam having a narrow energy spectrum in the range about 10 MeV, means for extracting energy from the beam in the form of electromagnetic radiation, means for accelerating the electron beam to replace the energy lost in said extraction means, an optical resonance cavity surrounding the extraction means for producing an output laser from the electromagnetic radiation, electron beam transport means for directing the electron beam in a recirculation loop through the acceleration means and the extraction means, a cooling laser means for generating a cooling laser beam with a laser radiation intensity in excess of $1 \times 10^7$ V/cm, a laser beam transport means for directing the cooling laser in a reflection path a portion of which is substantially the same as a portion of the electron beam recirculation loop so as to achieve Comption scattering interactions between some of the cooling laser photons and some of the electron beam electrons, whereby the Compton scattering interactions reduce the spreading of the energy spectrum of the electron beam caused by the action of the extracting means.

As a result of the interaction between the electron beam and extraction means and the electromagnetic radiation which is generated, the narrow energy spectrum of the electron beam is spread out, and the beam energy is reduced in magnitude as it passes the magnetic fields of the wiggler magnets. One of the aspects of this invention is to provide a recirculated electron beam with sufficient magnitude and a sufficiently narrow energy spectrum to produce an efficient output laser.

Improvement in the energy spectrum is achieved by directing the electron beam into a circulating path and by passing a cooling laser beam with an appropriate energy and intensity along a portion of the path of the electron beam. The photons of the laser beam will undergo Compton scattering reactions with the individual electrons of the electron beam. The laser beam is preferably directed to travel back and forth along the path of the electron beam. "Head on" scattering exerts a force which is orders of magnitude larger than "rear end" scattering. More energy is lost by the higher energy electrons than is lost by the lower energy electrons as the result of "head on" scattering. The "rear end" scattering will increase the energy of the electrons, and the slower electrons will be accelerated slightly more than the higher energy electrons. The result in all cases is a narrowing of the energy spectrum of the electron beam with each pass around the storage ring. This can be repeated until a minimum spread is reached. The average energy of the beam is reduced both by the action of the wiggler magnets and the cooling laser beam, but the initial average energy of the beam can be restored by an rf accelerator before it passes back through the magnetic fields of the wiggler magnets.

This invention also provides a method for cooling electron beams having electron energies in excess of 10 MeV for purposes other than use in free electron lasers.

DESCRIPTION OF THE PREFERRED EMBODIMENT

Figure 1:
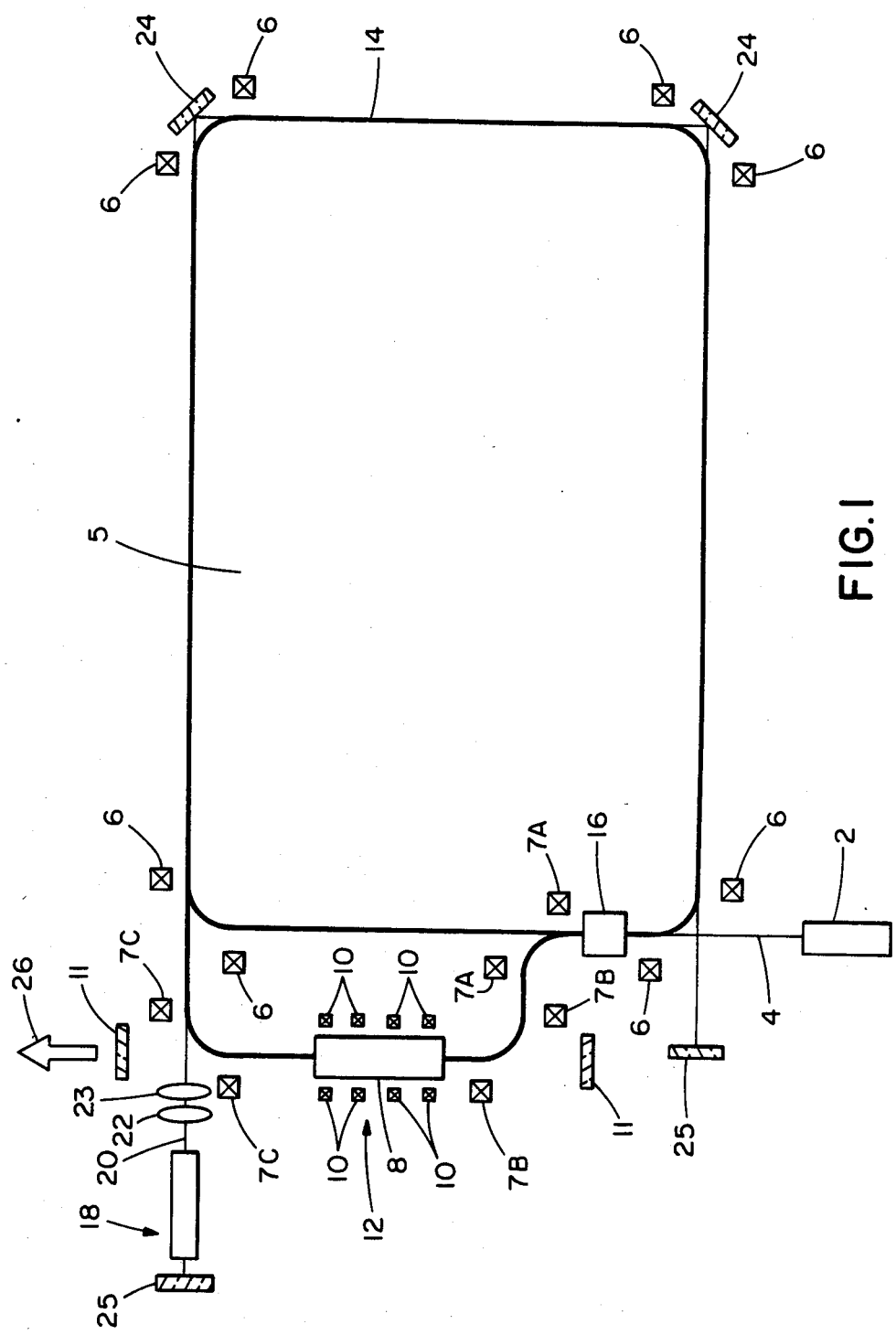
FIG. 1 is a diagrammatic illustration of the preferred embodiment of this invention.

FIG. 1 schematically illustrates a free electron laser system utilizing laser cooling in accordance with the present invention. An injector 2 produces an electron beam 4 of electrons having an energy of approximately 50 MeV. The beam is directed by conventional means including bending magnets 6 through a storage ring 5 comprising an rf accelerator 16. A control circuit not shown permits the electron beam to be diverted from time to time by bending magnets 7A, 7B and 7C through a free electron laser 12 comprising an optical resonance cavity 8 and wiggler magents 10. Laser mirrors 11 delimit the resonance cavity 8.

A $CO_2$ cooling laser 18 produces a laser beam 20 having a laser intensity of approximately $5 \times 10^7$ V/cm. The laser beam passes through focusing lenses 22 and 23 to narrow the beam cross section and is directed by conventional means comprising laser mirrors 24 along a reflection path a portion of which is the same as a portion of the electron beam storage loop. Laser mirrors 25 in this configuration define the boundaries of the laser resonance cavity. In this preferred embodiment, an overlap portion of the storage ring is, in effect, inside the laser resonance cavity. With the use of highly reflective mirrors and polarization of the cooling laser beam, the system could be arranged so that the overlap portion is outside the laser cavity, although this would be at the expense of efficiency of the cooling laser.

The number of passes around the cooling section depends on the synchrotron cooling rate, $\tau_{syn}$, which is a rough approximation of the time it takes the laser beam to reduce the energy spread of the electron beam by a factor of e (i.e. 2.718). The cooling rate can be estimated by:

$$\tau_{syn} = \frac{\pi \, m_o c}{\sigma_c \gamma_o E^2},$$

where
 $\gamma_o$ is the energy of the electron beam/$m_o c^2$
 $\sigma_c$ is the Thomson scattering cross section
 c is the speed of light
 E is the laser electric field intensity and
 $m_o$ is the rest mass of an electron.

Thus, for a 50 MeV electron beam and a $CO_2$ cooling laser with an laser field intensity of $1.6 \times 10^5$ stat volts/cm, $\gamma_o$ is about 100 and $\sigma_c$ is about $6.65 \times 10^{-25}$ $cm^2$ and the cooling time, therefore, would be roughly:

$$\tau_{syn} = 4 \times 10^{-5} \text{ sec.}$$

The cooling time could be established by directing the electron beam to circulate in the storage ring a number of times for each pass through the wiggler magnets. That number can be estimated as follows:

$$N \approx (c\tau_{syn})/L$$

where L is the length of the overlap.

For L of 40 meters, N would be approximately 300. In the preferred embodiment, the electron beam passes through the cooling section several hundred times for each pass through the free electron laser. A pulsed wave output laser beam 26 having an efficiency an order of magnitude better than single pass FEL and with and wavelengths in the range of 10 $\mu$m to 1 $\mu$m is produced.

The cooling rate, $\tau_{syn}$, as stated above is inversely proportional to the energy of the electron beam. In addition, it can be determined from the Fokker-Planck theory that the fractional energy spread of the electron beam at equilibrium is proportional to the square root of $\tau_{syn}$. For these reasons laser cooling of electron beams tends to become less useful as the energy of the beam decreases. A lower limit on the utility of this method is approximately 10 MeV.

Figure 2:
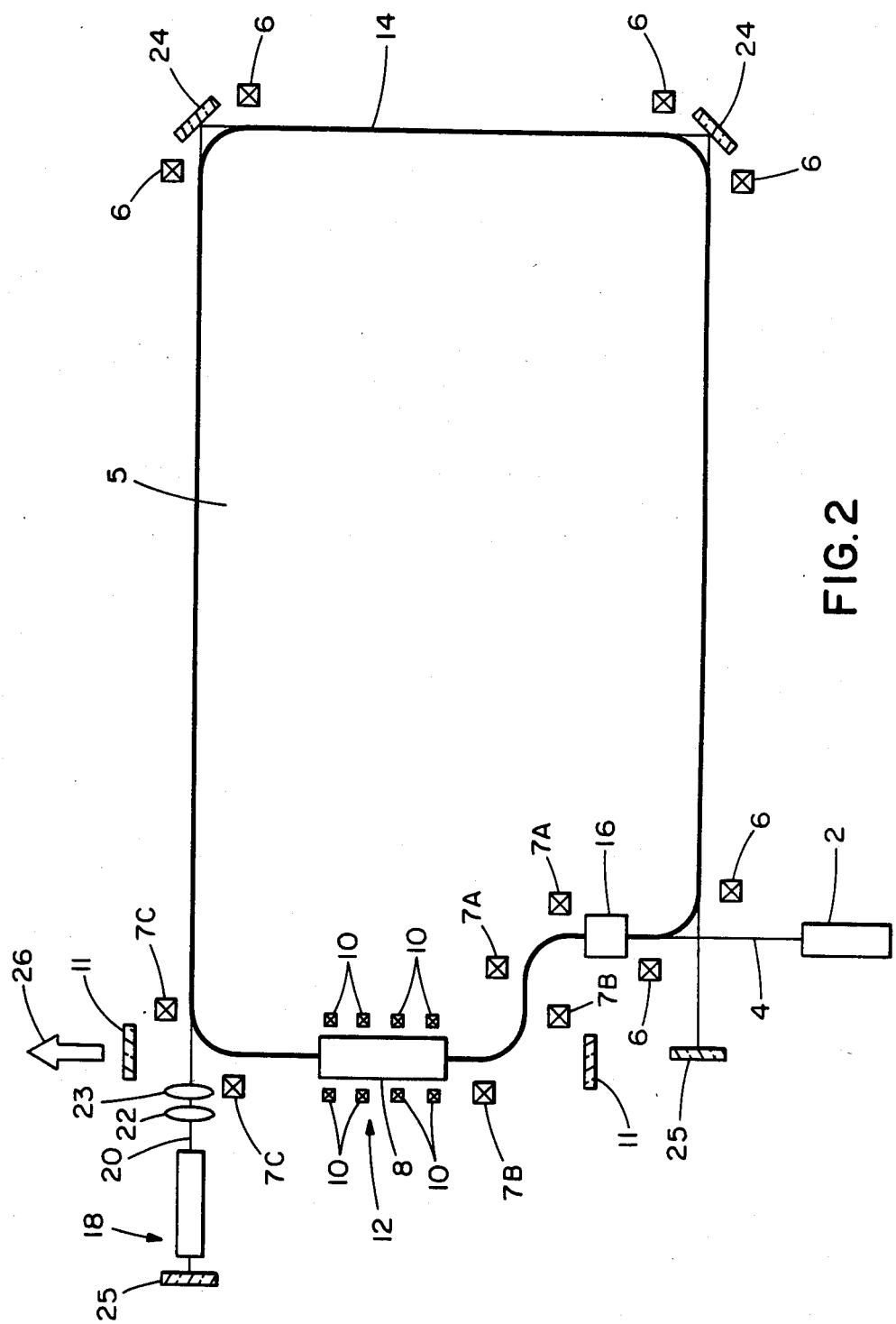
FIG. 2 is a diagrammatic illustration of a second preferred embodiment of this invention.

For a continuous output laser, the electron beam can be directed through the magnetic fields of the wiggler magnets with each turn through the storage ring. This arrangement is shown in FIG. 2 with each part of the system being identified as indicated above. The beam in this case would be cooled much less than under the arrangement shown in FIG. 1. Greater cooling, however, could be obtained by making the storage ring and its cooling portion longer.

The foregoing description of the present invention has been presented for the purposes of illustration and description, and it is not intended to be exhaustive or to limit the invention to the precise form and/or parameters disclosed. The foregoing description was chosen and described in order to best explain the principles of the invention in a practical application and to thereby enable others skilled in the art to best utilize the invention and various embodiments and with various modifications as are suited to the particular use contemplated.

For example, the cooling photon source can be other than a $CO_2$ laser. The quality of the photon beam (coherence and bandwidth) is not as essential as the intensity and frequency. If higher intensity, lower frequency photon sources are available (e.g., a FEL or a gyrotron of a different wavelength), they would work even better. This method of cooling an electron beam may also be used in accelerators. For high energy accelerators, the laser intensity requirement is weaker.

What is claimed is:

1. A free electron laser system with laser cooling comprising:
    means for producing a beam of electrons having narrow energy spectrum in a range above 10 MeV;
    electron beam transport means for circulating said electron beam in a recirculation loop;
    wiggler means disposed along the path of said electron beam for extracting energy from said electron beam in the form of electromagnetic radiation;
    an optical resonance cavity producing an output laser beam from said electromagnetic radiation;
    means for accelerating said electrons in said electron beam disposed along the path of said electron beam in order to replace energy lost in said wiggler means;

laser means for generating an input laser beam with a radiation intensity in excess of $1 \times 10^7$ V/cm; and laser beam transport means for directing said input laser beam back and forth along a portion of the electron beam recirculation loop so as to produce Compton scattering interactions between some of the input laser radiation and some of said electron beam electrons, said Compton scattering interactions reducing the spread of the energy spectrum of said electron beam caused by action of said wiggler means by preferentially speeding up slower electrons and preferentially slowing down faster electrons to produce laser cooling.

2. The free electron laser system of claim 1 wherein said means for accelerating said electron beam is an rf accelerator.

3. The free electron laser system of claim 1 wherein said laser means for generating a cooling laser beam comprises a $CO_2$ laser.

4. A method of cooling an electron beam moving in a path comprising the steps of:

producing an input laser beam; and directing said input laser beam to travel back and forth along a portion of the path of said electron beam so as to produce Compton scattering interactions between input laser photons and electron beam electrons, said Compton scattering interactions cooling said electron beam by preferentially speeding up slower electrons and preferentially slowing down faster electrons.

5. The method of claim 4 wherein said input laser beam is generated by a $CO_2$ laser.

6. The method of claim 4 wherein the electrons of said electron beam have an initial energy of approximately 10 MeV to 500 MeV.

7. The method of claim 5 wherein the electrons of said electron beam have an initial energy of approximately 10 MeV to 500 MeV.

8. A method of producing an output laser beam comprising the steps of:

producing a beam of electrons with the electrons at approximately the same energy in excess of 10 MeV;

circulating said electron beam in a recirculation loop;

extracting electromagnetic energy from said circulating beam;

producing an input laser beam;

directing said input laser beam to travel back and forth along a portion of the path of said electron beam in said loop so as to produce Compton scattering interactions between input laser photons and electron beam electrons, said Compton scattering interactions reducing the spread of the energy spectrum of the electron beam caused by said extracting of energy by preferentially speeding up slower electrons and preferentially slowing down faster electrons to produce laser cooling; and converting said extracted electromagnetic energy into an output laser beam using an optical resonance cavity.

* * * * *

UNITED STATES PATENT AND TRADEMARK OFFICE
CERTIFICATE OF CORRECTION

PATENT NO. : 4,688,227

DATED : August 18, 1987

INVENTOR(S) : Vincent Sik-Hung Chan, et al.

It is certified that error appears in the above-identified patent and that said Letters Patent is hereby corrected as shown below:

ON THE TITLE PAGE:

In the list of "Other Publications", the date of "Gover et al." should be --Jan '82--.

In the Specification:

Column 1, line 7, change "moe" to --more--.

Column 2, line 16, change "election" to --electron--;

line 20, change "about" to --above--;

line 35, change "Comption" to --Compton--;

line 45, after "passes" insert --through--.

Column 3, line 11, change "the" to --one--;

line 28, change "magents" to --magnets--;

line 63, change "an" to --a--.

Column 4, line 15, delete "and".

Signed and Sealed this

Second Day of February, 1988

Attest:

DONALD J. QUIGG

Attesting Officer        Commissioner of Patents and Trademarks